(12) United States Patent
Slater (10) Patent No.: US 10,670,528 B2
(45) Date of Patent: Jun. 2, 2020

(54) SYSTEM FOR MEASURING COMPOSITION OF A MIXED PHASE FLUID

(71) Applicant: Kaiser Optical Systems Inc., Ann Arbor, MI (US)

(72) Inventor: Joseph B. Slater, Dexter, MI (US)

(73) Assignee: Kaiser Optical Systems Inc., Ann Arbor, MI (US)

( * ) Notice: Subject to any disclaimer, the term of this patent is extended or adjusted under 35 U.S.C. 154(b) by 69 days.

(21) Appl. No.: 16/178,728

(22) Filed: Nov. 2, 2018

(65) Prior Publication Data

US 2020/0141870 A1 May 7, 2020

(51) Int. Cl.
| | |
|---|---|
| *G01N 21/65* | (2006.01) |
| *G01J 3/44* | (2006.01) |
| *G01N 21/17* | (2006.01) |
| *G01N 21/84* | (2006.01) |

(52) U.S. Cl.
CPC ............ *G01N 21/65* (2013.01); *G01J 3/4412* (2013.01); *G01N 21/17* (2013.01); *G01N 21/84* (2013.01); *G01N 2021/1763* (2013.01); *G01N 2021/651* (2013.01); *G01N 2021/8405* (2013.01)

(58) Field of Classification Search
CPC ........ G01N 21/65; G01N 21/17; G01N 21/84; G01N 2021/1763; G01N 2021/651; G01N 2021/8405; G01J 3/4412
See application file for complete search history.

(56) References Cited

U.S. PATENT DOCUMENTS

| | | | |
|---|---|---|---|
| 6,907,149 B2 | 6/2005 | Slater | |
| 7,385,692 B1 * | 6/2008 | Nguyen | G01J 3/02 356/301 |
| 7,692,786 B2 | 4/2010 | Tedesco et al. | |
| 8,824,042 B2 | 9/2014 | Tedesco et al. | |
| 9,606,063 B2 | 3/2017 | Lee et al. | |

* cited by examiner

*Primary Examiner* — Jamil Ahmed
(74) *Attorney, Agent, or Firm* — Christopher R. Powers; PatServe (57) ABSTRACT

A Raman spectroscopic measurement system for measuring the material composition of a mixed phase fluid having a gas phase dispersed in a liquid phase or vice versa is disclosed, which includes an insert to be inserted into a process. The insert includes a measurement chamber partially defined by a phase separating membrane that enables the gas phase to diffuse into and out of the measurement chamber and facilitates coalescing of the liquid phase which into a collector. A first probe of the measurement system is configured to transmit excitation light into the measurement chamber and to receive a Raman signal emanating from the gas phase therein, and a second probe is configured to transmit excitation light into the drain and to receive a Raman signal emanating from the liquid phase therein. The measurement system further includes a spectrometer to determine the material composition of the fluid from the Raman signals.

20 Claims, 4 Drawing Sheets

SYSTEM FOR MEASURING COMPOSITION OF A MIXED PHASE FLUID

TECHNICAL FIELD

The present disclosure relates to a spectroscopic measurement system for measuring a material composition of a mixed phase fluid, in particular using Raman spectroscopy.

BACKGROUND

There are a number of industrial applications requiring analysis of a mixed phase fluid. One example is the natural gas industry, where there is a need to analyze shale gas or wet gas comprising a natural gas as well as natural gas liquids and other liquids. Natural gases normally consist of methane and lesser amounts of other constituents, e.g., ethane and propane. Natural gas liquids typically comprise C4 hydrocarbons and heavier hydrocarbons. In the natural gas industry, it is quite often desired to determine the material composition of shale or wet gas flowing through a pipe, e.g., to determine its energy content. However, quantitative determinations of the energy content of mixed phase fluids require quantitative determinations of the material composition of the gas phase and the liquid phase. To this extent it is desirable not only to determine the presence of certain components comprised in the gas phase or the liquid phase of the fluid, but also the relative amounts or concentrations of these components of the composite fluid.

Conventionally, gas chromatographs have been applied to perform such multiphase analysis based on samples of the composite fluid taken at the industrial site. However, this approach has several disadvantages. Analysis methods performed with gas chromatographs require a rather complex sample handling system and, thus, are not capable of providing measurement results in real-time. In addition, such analysis requires modification of the temperature and the pressure of the mixed phase fluid samples, which may alter the composition of the analyzed material (i.e., the composite fluid). Consequently, a material composition determined based on such preprocessed samples may not reproduce the relative amounts or concentrations of the components in the mixed phase fluid correctly. In addition, shale or wet gases normally include a significant amount of water vapor as well as other gaseous components, like hydrogen sulfide, for example, which may impair the measurements or even damage the analyzer of the gas chromatograph. Thus, the samples must be dried and decontaminated, which renders the conventional method even slower and less reliable than it may otherwise be.

It is known in the art that the material composition of a gas or a liquid can be determined much faster by means of Raman spectroscopy. U.S. Pat. No. 7,385,692 B1 describes a Raman spectroscopic measurement system for determining gas concentrations in liquid receptacles. The disclosed system includes a Raman probe having a sensor tip inserted into the gas located above the liquid. The sensor tip includes a porous, gas-permeable cover preventing liquid from entering and interfering with the Raman spectroscopic measurement of the material composition of the gas inside the cover, which would otherwise cause the Raman scattered signal to be dominated by signal components emanating from the liquid, which do not represent the material composition of the gas.

U.S. Pat. No. 9,606,063 B2 describes a Raman spectroscopic measurement system for measuring the composition of a multi-phase flow fluid inside a high-pressure pipeline, the multi-phase flow fluid having a liquid-based multiphase flowing fluid chiefly located in the lower portion of the pipeline and a gas-based multiphase flowing fluid chiefly located in an upper portion of the pipeline. This system performs an analysis of the components and the composition of the gas-based multiphase flowing fluid using a first Raman probe installed in the upper portion of the pipeline. An analysis of the components and the composition of the liquid-based multiphase flowing fluid is performed using a second Raman probe installed in the lower portion of the pipeline. Accordingly, determining the material composition of the multi-phase flow fluid using this measurement system requires two separate Raman probes to be installed separately in two openings spaced along the pipeline. Two separate probes both increases installation costs and requires mounting means for each probe, each capable of not only holding the probe in place but also of properly sealing off the respective opening.

The Raman spectroscopic measurement system described in U.S. Pat. No. 9,606,063 B2 cannot be applied to analyze mixed phase fluids, e.g., mixed phase fluids ranging from thin aerosols to thick foams, where the gas phase is dispersed in the liquid phase or vice versa, because the Raman scattered signal received by the two Raman probes would both be dominated by Raman scattered signals emanating from the liquid phase. This makes it impossible or at least extremely difficult to extract sufficient information to truly account for the phase ratio of the liquid phase and the gas phase as well as for the material composition of the gas phase comprised in the fluid.

Accordingly, there remains a need for further contributions in this area of technology.

SUMMARY

The present disclosure discloses a spectroscopic measurement system for measuring the material composition of a mixed phase fluid simultaneously accounting for the material composition of a gas phase and of a liquid phase comprised in the mixed phase fluid. In an aspect of the present disclosure, the measurement system includes an insert configured to be inserted into the pipe, the insert including: a measurement chamber defined on at least one side by a phase separating membrane, the phase separating membrane adapted to enable the gas phase of the fluid flowing through the pipe to diffuse into and out of the measurement chamber and to facilitate coalescing of the liquid phase of the fluid outside the measurement chamber, wherein the gas phase within the measurement chamber defines a gas sample; and a collector disposed adjacent the measurement chamber such that the coalesced liquid from outside the measurement chamber drains into the collector, wherein the collector includes a drain in fluid communication with the pipe such that the coalesced liquid collected by the collector flows through the drain and returns to the fluid flow of the pipe, and wherein the coalesced liquid flowing through the drain defines a liquid sample.

The measurement system further includes a first probe mounted onto the insert, the first probe including a first probe tip extending into the measurement chamber and configured to transmit excitation light into the measurement chamber and to receive a gas Raman signal emanating from the gas sample within the measurement chamber; a second probe mounted onto the insert, the second probe including a second probe tip extending into the drain and configured to transmit excitation light into the drain and to receive a liquid Raman signal emanating from the liquid sample flowing through the drain; and an excitation light generation and signal evaluation unit configured to generate the excitation light, provide the excitation light to the first probe and the second probe, receive the gas Raman signal from the first probe and the liquid Raman signal from the second probe, and determine the material composition of the fluid based on the gas Raman signal from the first probe and/or the liquid Raman signal.

In an embodiment, the excitation light generation and signal evaluation unit is further configured to determine the material composition of the fluid by determining a presence of one or more components of at least one of the gas phase and the liquid phase and/or determining relative amounts or concentrations of two or more components of at least one of the gas phase and the liquid phase.

In an embodiment, the excitation light generation and signal evaluation unit includes an input configured to receive a flow rate of the fluid flowing through the pipe transmitted to the excitation light generation and signal evaluation unit by a flow meter measuring the flow rate, and the excitation light generation and signal evaluation unit is further configured to determine relative amounts or concentrations of a set of predefined components of the fluid and to determine an energy content of the fluid based on the determined relative amounts or concentrations of the set of predefined components and on the flow rate provided via the input.

In an embodiment, the phase separating membrane includes a chemically inert membrane material. In such an embodiment, the chemically inert membrane material is expanded polytetrafluorethylene (PTFE) or spun-bonded silica.

In another embodiment, the excitation light generation and signal evaluation unit includes: an excitation light generator adapted to generate the excitation light and transmit the excitation light to the first probe and the second probe, wherein the excitation light is monochromatic light having a wavelength between 300 nm and 1.5 µm; an evaluation unit configured to analyzing Raman spectra and determine the material composition of the mixed phase fluid based on the Raman spectra; and a spectrograph configured to receive the gas Raman signal and the liquid Raman signal transmitted from the first probe and the second probe, filter Raman scattered light from the gas and liquid Raman signals, and disperse the Raman scattered light into different wavelengths, wherein the spectrograph includes a detector adapted to detect an intensity of the Raman scattered light as a function of a wavelength and provide the thus-obtained Raman spectra to the evaluation unit.

In such an embodiment, the first probe is connected to the excitation light generation and signal evaluation unit via a first optical cable including at least one excitation fiber adapted to transmit the excitation light from the excitation light generator to the first probe and at least one collection fiber adapted to transmit the Raman signal received by the first probe to the detector, and/or wherein the second probe is connected to the excitation light generation and signal evaluation unit via a second optical cable including at least one excitation fiber adapted to transmit the excitation light from the excitation light generator to the second probe and at least one collection fiber adapted to transmit the Raman signal received by the second probe to the detector. In at least one embodiment, the excitation light is monochromatic light having a wavelength between 770 nm and 790 nm.

In yet another embodiment, the insert includes an insert base embodied to close off an opening in the pipe, the insert base including a mounting for attaching the insert to the pipe, and the first probe is attached to insert base such that the first probe tip extends through the insert base into the measurement chamber.

In yet another embodiment, the phase separating membrane is mounted to a support including a substantially cylindrical frame defining the measurement chamber and having at least one opening between an interior of the measurement chamber and an interior of the pipe, and the at least one opening in the support is covered or filled by at least a portion of the phase separating membrane. In such an embodiment, the insert includes a plurality of openings and a plurality of phase separating membranes, each phase separating membrane mounted to the support such that each opening is covered or filled by at least one of the plurality of phase separating membranes.

In an embodiment, the collector includes a channel connecting a collector entrance to the drain, and the collector is disposed adjacent the measurement chamber such that the coalesced liquid flows into the drain via the collector entrance and channel.

In another embodiment, the insert includes an insert base embodied to cover an opening in the pipe, the insert base defining a side of the measurement chamber and including a support attached to the insert base and adapted to support the phase separating membrane, and the collector is connected to an end section of the support opposite the insert base such that the collector defines an opposing side of the measurement chamber opposite the insert base.

In yet another embodiment, the insert includes an insert base that closes off an opening in the pipe through which the insert is inserted into the pipe, the second probe is mounted to the insert such that the second probe tip extends through a wall of the collector and into an interior of the drain, and the second probe is connected to the excitation light generation and signal evaluation unit, which is disposed outside the pipe, via an optical cable extending through the insert base.

In yet another embodiment, the first probe includes a focusing objective including first surface mirrors or reflectors embodied and arranged to focus the excitation light onto the gas sample in the measurement chamber and to collect the Raman signal emanating from the gas sample, the first surface mirrors or the reflectors are arranged as to capture the excitation light within the focusing objective, and/or the reflectors generate a first focus situated within the measurement chamber and a second focus situated within the measurement chamber, causing the incoming excitation light focused onto one of the first focus or second focus to be multiply reflected and refocused onto the other of the first focus or second focus, alternating foci such that the numerical aperture of the excitation light progressively increases before the excitation light is collected together with the Raman signal emanating from the gas sample, wherein the first focus is a real focus and the second focus is a real or virtual focus.

In an embodiment, the first probe includes: an excitation lens adapted to collimate the excitation light transmitted to the first probe; a mirror configured to reflect the filtered excitation light onto a beam combiner that is configured to direct the excitation light along a counter-propagating path to a focusing objective, wherein the focusing objective is adapted to focus the excitation light onto the gas sample within the measurement chamber and to collect the Raman signal emanating from the gas sample; a notch filter adapted to filter the collected Raman signal returning along the counter-propagating path through the combiner; and a collection lens adapted to focus the filtered collected Raman signal into a collection fiber configured to transmit the collected Raman signal to the excitation light generation and signal evaluation unit. In such an embodiment, the first probe further includes a bandpass filter having a filter coating on a bandpass substrate and adapted to filter the collimated excitation light, the mirror includes a reflective coating on a mirror substrate, the beam combiner includes a combiner coating on a combiner substrate, the filter coating, the reflective coating and the combiner coating are oriented such that the excitation light does not pass through the bandpass substrate, the mirror substrate or the combiner substrate after being filtered by the filter coating of the bandpass filter and before the excitation light is transmitted onto the gas sample, and the transmitted excitation light is collected substantially in its entirety by the focusing objective and redirected by the combiner coating and the reflective coating back through the filter coating.

In yet another embodiment, the second probe includes: an excitation lens adapted to collimate the excitation light transmitted to the second probe; a mirror configured to reflect the filtered excitation light onto a beam combiner that is configured to direct the excitation light along a counter-propagating path to a focusing objective, wherein the focusing objective is adapted to focus the excitation light onto the liquid sample within the drain and to collect the Raman signal emanating from the liquid sample; a notch filter adapted to filter the collected Raman signal returning along the counter-propagating path through the combiner; and a collection lens adapted to focus the filtered collected into a collection fiber configured to transmit the collected Raman signal to the excitation light generation and signal evaluation unit. In such an embodiment, the first probe further includes a bandpass filter adapted to filter the collimated excitation light, the beam combiner and the notch filter are dielectric edge filters, and/or the mirror and the beam combiner are supported at an angle of 20 degrees or less.

In an embodiment, the second probe tip of the second probe is capped by an isolation window separating an interior of the second probe tip, which includes a focusing objective adapted to focus the excitation light onto the liquid sample within the drain and to collect the Raman signal emanating from the liquid sample, and the isolation window is a sapphire window or another window transparent to the excitation light and the Raman signal. In yet another embodiment, the second probe is smaller in size than the first probe.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
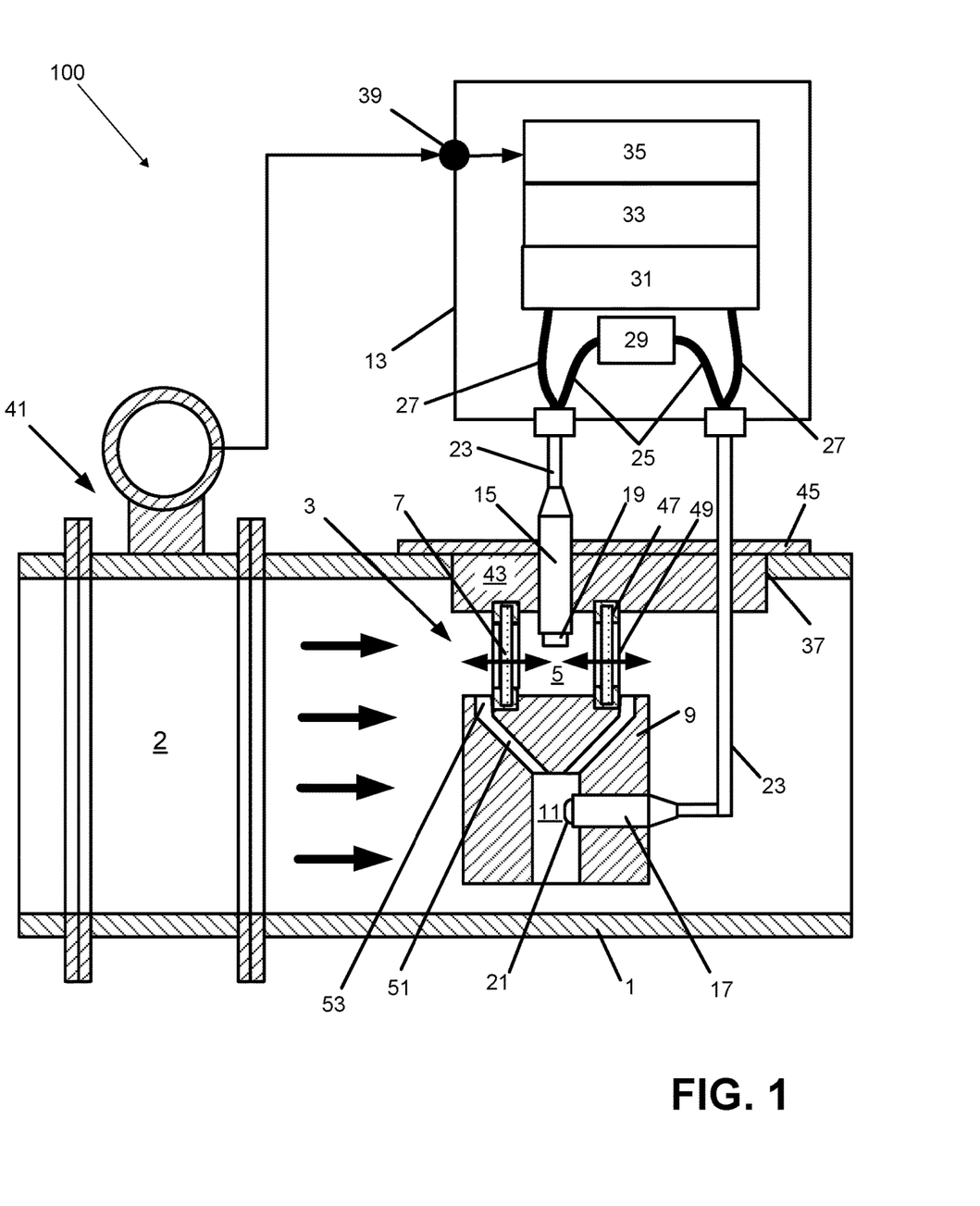
FIG. 1 shows a Raman spectroscopic measurement system, according to the present disclosure.

The present disclosure includes a Raman spectroscopic measurement system 100 for measuring a composite material composition of a mixed phase fluid 2, as shown in FIG. 1. Such a mixed phase fluid 2 may include a gas phase dispersed in a liquid phase or vice versa. The measurement system 100 may be employed to measure a composite material composition of the mixed phase fluid 2 flowing through a pipe 1. In FIG. 1, the direction of flow of the mixed phase fluid 2 is indicated by parallel arrows. The pipe 1 may be a gas pipeline, a production tubing of a petroleum well, or a process pipe of a refining or distillation process or of any other process involving a mixed phase fluid.

The measurement system 100 includes an insert 3 structured to be inserted into the pipe 1, for example, through an opening in a wall of the pipe 1. The insert 3 includes a measurement chamber 5 separated from the fluid flow by at least one phase separating membrane 7. The separating membrane 7 is adapted to allow the gas phase of the mixed phase fluid 2 flowing around the measurement chamber 5 to diffuse into, through and out of the measurement chamber 5, as indicated by the double pointed arrows. From the gas phase diffusing into, through and out of the measurement chamber 5, a gas sample of the gas phase of the mixed phase fluid 2 may be taken. The separating membrane 7 is further adapted to prevent the liquid phase of the mixed phase fluid 2 from entering the measurement chamber 5. The liquid phase of the mixed phase fluid 2 coalesces along an exterior surface of the measurement chamber 5 and the separating membrane 7. The at least one phase separating membrane 7 continuously separates a fraction of the mixed phase fluid flowing past the chamber 5 into a gas fraction, diffusing into, through and out of the chamber 5, and a liquid fraction coalescing on the exterior surface of the measurement chamber 5, thus preventing any liquid from the mixed phase fluid 2 from entering the measurement chamber 5.

FIG. 1 shows an embodiment of the measurement system 100 having a single, essentially cylindrical phase separating membrane 7 surrounding the measurement chamber 5. In alternative embodiments, the separating membrane 7 may have other forms. For example, the measurement system 100 may include two or more phase separating membranes 7, providing gas-permeable windows distributed along an exterior wall of the measurement chamber 5. Regardless of the number of phase separating membranes 7, each such separating membrane 7 may include a chemically inert membrane material, for example, expanded polytetrafluoroethylene (PTFE). Alternatively, the separating membrane 7 may be spun-bonded silica or other suitable gas-permeable phase separating membrane materials capable of continuously separating the liquid in a fluid from the gas. As further nonlimiting examples, the separating membrane 7 may include membrane materials applied in coalescing filters used in the oil and gas industry or membrane materials applied in the GENIE® Permanent Insertion Probe™ sold by A+Corporation.

The insert 3 further includes a collector 9 configured to collect the coalesced liquid that drains down along the exterior surface of the measurement chamber 5 and into a drain 11 disposed within the collector 9 having a drain volume, which returns the coalesced liquid collected by the collector 9 into the pipe 1, as shown in FIG. 1. From the coalesced liquid passing through the drain 11, a liquid sample of the liquid phase of the mixed phase fluid 2 may be defined or taken. The collector 9 and the drain 11 may be stainless steel or other non-reactive material, for example.

The measurement system 100 further may include an excitation light generation and signal evaluation unit 13 and two Raman probes 15, 17. The first probe 15 may include a probe tip 19 extending into the measurement chamber 5. The first probe 15 is configured to transmit excitation light into the measurement chamber 5 and to receive a Raman signal emanating from the gas sample of the gas phase inside the measurement chamber 5. The first probe 15 may be mounted onto the insert 3, as shown in FIG. 1. In an alternative embodiment, the first probe 15 may be mounted directly to the wall of the pipe 1.

The second Raman probe 17 may include a probe tip 21 extending into the drain 11. The second probe 17 is configured to transmit excitation light into the drain 11 and to receive a Raman signal emanating from the liquid sample of the liquid draining through the drain 11. The second Raman probe 17 may be mounted onto the insert 3 such that the probe tip 21 extends into the drain 11.

Each probe 15, 17 is connected to the excitation light generation and signal evaluation unit 13 via a separate optical cable 23. Each optical cable 23 may include at least one excitation fiber 25 arranged to transmit excitation light to the corresponding probe 15, 17. Each optical cable 23 may further include and at least one collection fiber 27 arranged to transmit the Raman signal received by the corresponding probe 15, 17 to the excitation light generation and signal evaluation unit 13. In at least one embodiment, the optical cables 23 may be multimode fiber optic cables. The excitation light generation and signal evaluation unit 13 generates the excitation light to the first probe 15 and the second probe 17 and analyzes the Raman signals received from the first probe 15 and the second probe 17 to determine a material composition of the mixed phase fluid 2.

FIG. 1 shows an exemplary embodiment of the excitation light generation and signal evaluation unit 13 including a light generator 29, a Raman spectrograph 31, a detector 33 and an evaluation unit 35. The light generator 29 includes at least one source of monochromatic light configured to provide the excitation light to each of the probes 15, 17 via the corresponding excitation fiber 25 of the optical cables 23. In at least one embodiment, the light generator 29 is a laser. In certain embodiments, the light generator 29 is a gas laser. Alternatively, the light generator 29 may be a solid-state laser. In another embodiment, the light generator 29 may be a semiconductor laser or other suitable monochromatic source.

The excitation light may be monochromatic light having a wavelength of 300 nanometers (nm) to 1.5 microns ($\mu$m). In at least one embodiment, the excitation light may have a wavelength of 770 nm to 790 nm. Excitation light of wavelengths of 770 nm to 790 nm has the advantage that such wavelengths are long enough to reduce or even prevent the excitation of fluorescence, which may disturb Raman spectroscopic measurements, but short enough to ensure a high ratio of the signal strength of the Raman signal relative to an excitation power of the excitation light. A further advantage is that the full range of Raman shift information included in the Raman signal can be detected by the detector 33, where the detector 33 is a silicon-based detector, for example, a charge coupled device (CCD) detector having suitable noise characteristics.

In at least one embodiment, the Raman spectrograph 31 receives the Raman signals conveyed by the first and the second probes 15, 17 via the corresponding collection fiber 27 of the optical cables 23, filters Raman scattered light from the Raman signals, and disperses the remaining Raman scattered light into different wavelengths. Such a technique is commonly called "dispersive Raman." In alternative embodiments, other Raman techniques may be used, for example, FT-Raman. One skilled in the art having the benefit of the present disclosure will recognize the appropriate Raman technique for a given application and will know the specific type of Raman spectrometer appropriate for the chosen Raman technique. Accordingly, the scope of the present disclosure is not limited to the description of the Raman spectrograph 31 or the dispersive Raman technique.

The detector 33 connected to the Raman spectrograph 31 detects the intensity of the Raman scattered light as a function of the wavelength to generate Raman spectra and may transmit the thus-obtained Raman spectra to the evaluation unit 35. The evaluation unit 35 analyzes the Raman spectra and determines the composite material composition of the mixed phase fluid 2, including the gas phase and the liquid phase separated at the insert 3.

Determination of the material composition of the mixed phase fluid 2 includes at least one of determining a presence of one or more components of at least one of the gas phase and the liquid phase of the mixed phase fluid 2 and determining relative amounts or concentrations of the two or more components of at least one of the gas phase and the liquid phase of the mixed phase fluid 2. Because the phase separating membrane 7 prevent any of the liquid phase from entering the measurement chamber 5, the Raman signals captured by the first probe 15 are representative of the components and thus the composition of the gas phase in the measurement chamber 5. At the same time, the Raman signals captured by the second probe 17 are representative of the components and thus the composition of the liquid phase draining through the drain 11.

During operation, the insert 3 comprising the measurement chamber 5, the collector 9, the drain 11, first Raman probe 15 and the second Raman probe 17 is exposed to a temperature and a pressure prevailing inside the pipe 1. In consequence a thermal and pressure equilibrium will establish and prevail, which ensures, that the phase ratio of the liquid phase and the gas phase, as well as the material composition of the liquid phase and of the gas phase will essentially remain unaltered. Thus, in combination, the Raman scattered signals simultaneously received by the first and the second Raman probe 15 truly reflect the material composition of the mixed phase fluid. In consequence, the material composition determined by the measurement system according to the invention truly accounts for the phase ratio, as well as for the material composition of both the gas phase and the liquid phase comprised in the fluid.

In at least one embodiment of the present disclosure, the excitation light generation and signal evaluation unit 13 may include an input 39 providing a flow rate of the mixed phase fluid 2 flowing through the pipe 1. In such an embodiment, the evaluation unit 35 may determine the relative amounts or concentrations of a set of predefined components of the mixed phase fluid 2 and determines an energy content of the mixed phase fluid 2 based on the determined relative amounts or concentrations of the set of predefined components and the flow rate. As a nonlimiting example, the energy content of a shale or wet gas can be determined based on the flow rate and the relative amounts or concentrations of hydrocarbon species, such as methane, ethane and propane, for example, included in the liquid phase and of typically heavier, higher carbon bond components such as butane, pentane and hexane, for example, included in the liquid phase.

In at least one embodiment, the flow rate is provided to the input 39 by a flow meter 41 continuously measuring the flow rate of the mixed phase fluid 2 flowing through the pipe 1, as shown in FIG. 1. Alternatively, the flow rate may be provided to the input 39 from an external source. The flow meter 41 may be a conventional flow meter 41, and the flow meter 41 may be installed on the pipe 1 or upstream or downstream of the pipe 1. Such flow meters are frequently employed at industrial sites, for example, for process control and/or automation. For applications that do not have such a flow meter installed for another purpose, the flow meter 41 can be provided and installed on the pipe 1 as part of or in addition to the measurement system 100.

In the following, examples of certain embodiments of individual components of the measurement system 100 are described. However, one skilled in the art having the benefit of the present disclosure will understand that alternative embodiments of one or more of these components capable of performing the function of the corresponding component could be used instead, without deviating from the scope of the present disclosure.

In the exemplary embodiment shown in FIG. 1, the insert 3 includes an insert base 43 that closes off (e.g., seals off) an opening 37 in the pipe 1. The insert base 43 may include a mounting plate 45 for reversibly mounting the insert 3 onto a corresponding counterpart provided on the pipe 1. In certain embodiments, the mounting plate 45 may include compression fittings, flange mountings or a suitable process connection for reversibly attaching to a process known in the art. In an embodiment, the first probe 15 is mounted onto the insert base 43 such that the probe tip 19 extends through the insert base 43 into the measurement chamber 5.

As shown in FIG. 1, the separating membrane 7 may be supported and retained by a support 47. The support 47 may be mounted onto an interior surface of the insert base 43 facing toward an interior of the pipe 1. The support 47 may include a substantially cylindrical frame surrounding the measurement chamber 5 and having at least one opening 49 therethrough connecting an interior of the measurement chamber 5 to the environment of the pipe 1. In embodiments having one separating membrane 7, each opening 49 may be covered or filled by a section of the separating membrane 7. In embodiments having more than one separating membrane 7, each of the separating membranes 7 may be mounted to and retained by the support 47. In such an embodiment, each opening 49 may be filled by one of the separating membranes 7 attached to a frame section surrounding the respective opening 49.

The collector 9 may include a funnel-shaped (e.g., inclined) channel 51 connecting an annular collector entrance 53 to the drain 11, the collector entrance 53 located at or near a bottom end of the measurement chamber 5 opposite the insert base 43. As shown in FIG. 1, the collector 9 with the drain 11 may be disposed below the measurement chamber 5 opposite the insert base 43. In such an embodiment, the collector 9 may define one side of the measurement chamber 5, and the insert base 43 may define another side of the measurement chamber 5 with the support 47 disposed therebetween. The support 47 may be attached to the insert base 43, the collector 9 or both. In certain embodiments, the support 47 may be trapped (e.g., mounted) between the insert base 43 and the collector 9 but not attached to either.

The second probe 17 may be mounted onto the insert 3 such that the probe tip 21 extends through a wall of the collector 9 and into the drain 11. The optical cable 23 connecting the second probe 17 to the excitation light generation and signal evaluation unit 13 located outside the pipe 1 may extend through the insert base 43.

Figure 2:
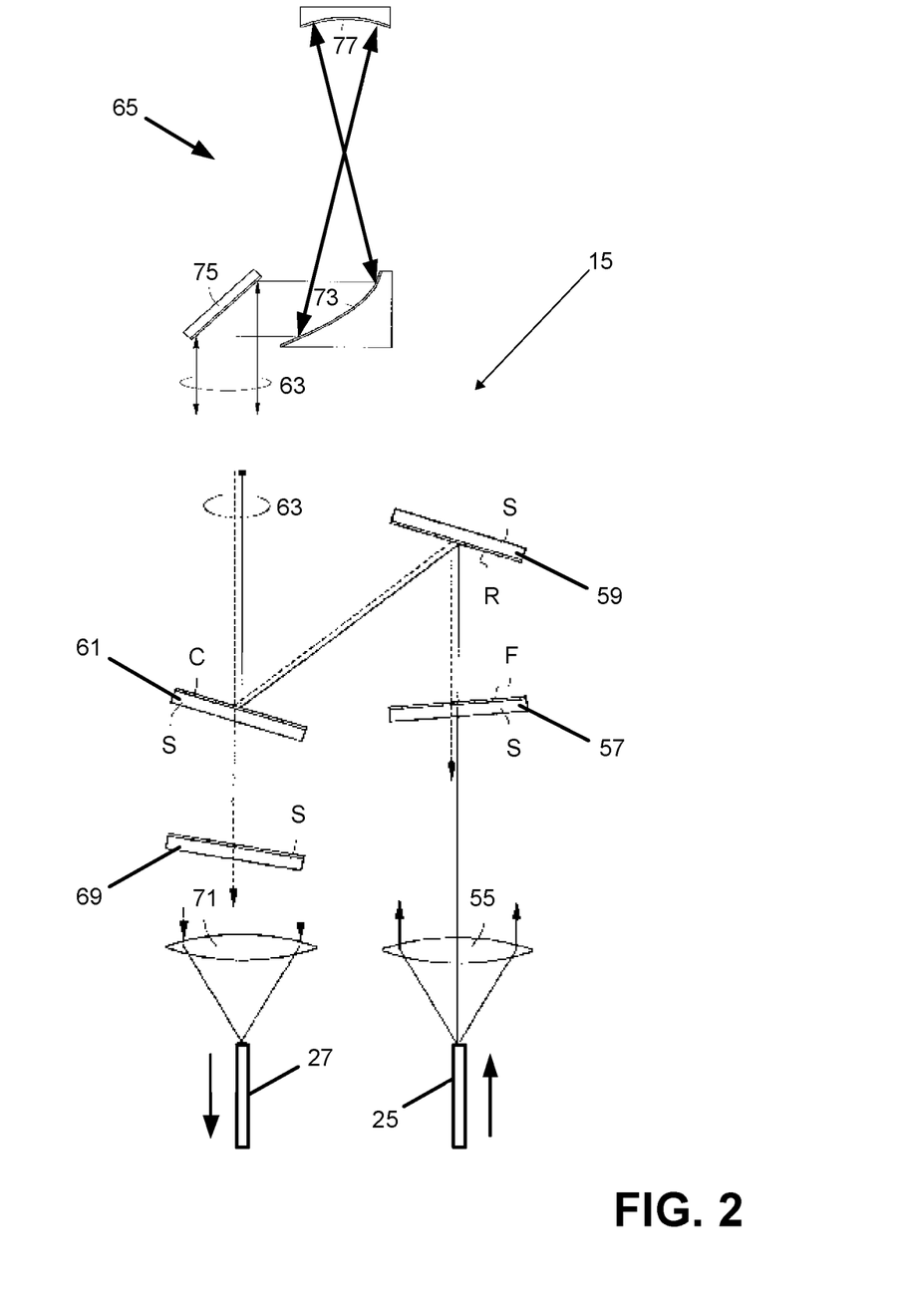
FIG. 2 shows an embodiment of a first Raman probe.
Figure 3:
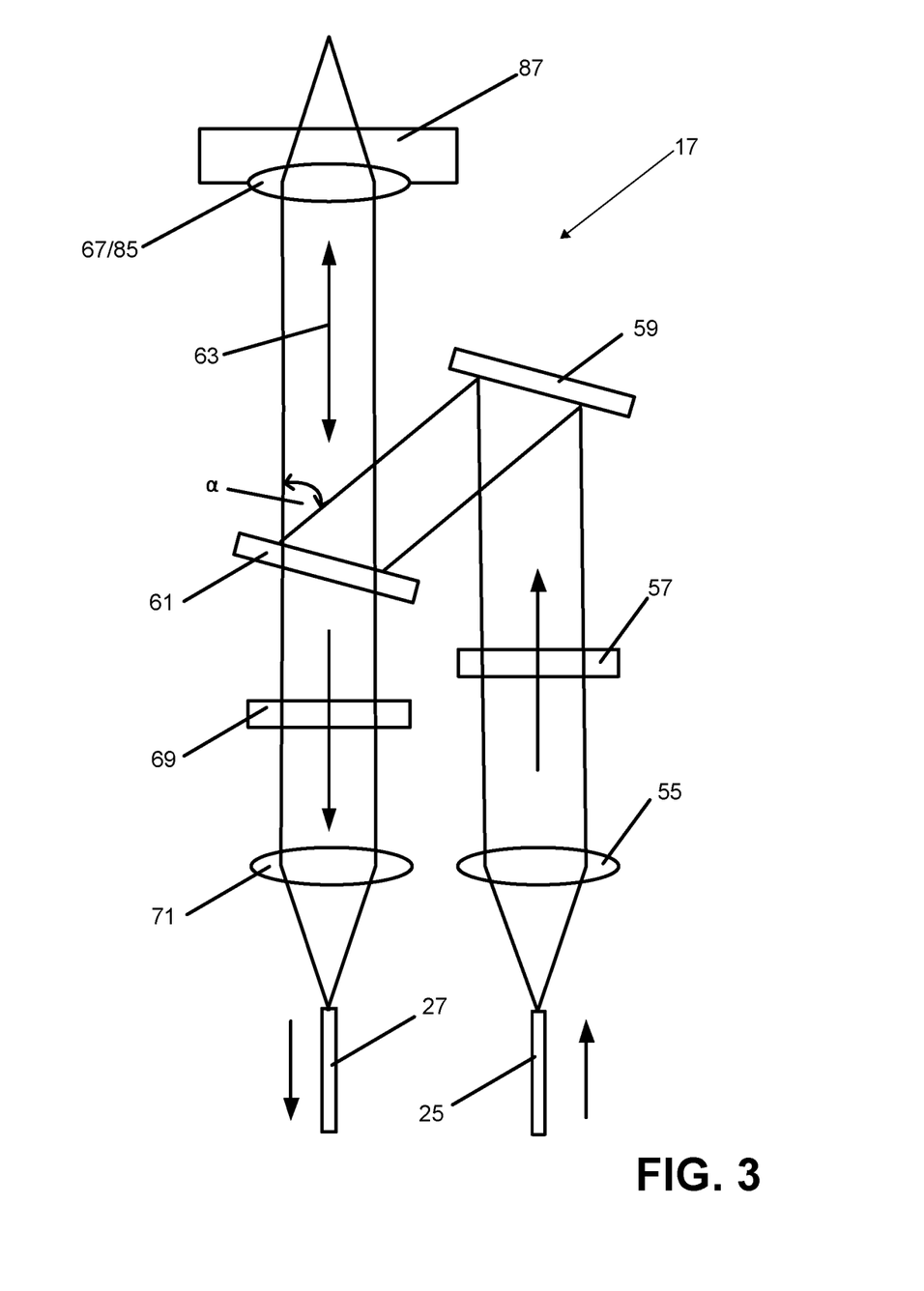
FIG. 3 shows an embodiment of a second Raman probe.

The first probe 15 and the second probe 17 may each be conventional Raman probes known in the art. FIG. 2 shows an exemplary schematic of the first probe 15, and FIG. 3 shows an exemplary schematic of the second probe 17. Both probes 15, 17 include an excitation lens 55 collimating the excitation light transmitted to the probes 15, 17 via the corresponding excitation fiber 25. Both probes 15, 17 further include a bandpass filter 57, which filters the collimated excitation light, and a mirror 59 that reflects the filtered excitation light onto a beam combiner 61. In the second probe 17, the combiner 61 directs the excitation light along a counter-propagating path 63 to a focusing objective 67.

In the first probe 15, the combiner 61 directs the excitation light along a counter-propagating path 63 to a focusing objective 65. In both the first probe 15 and the second probe 17, the focusing objectives 65, 67 focus the excitation light into the gas sample within the measurement chamber 5 or the liquid sample within the drain 11, respectively, and collect the Raman signals emanating from the samples. The Raman signals are then transmitted on a return path along the counter-propagating path 63 through the combiner 61 and are filtered by a notch filter 69 before being focused onto the corresponding collection fiber 27 by a collection lens 71.

Figure 4:
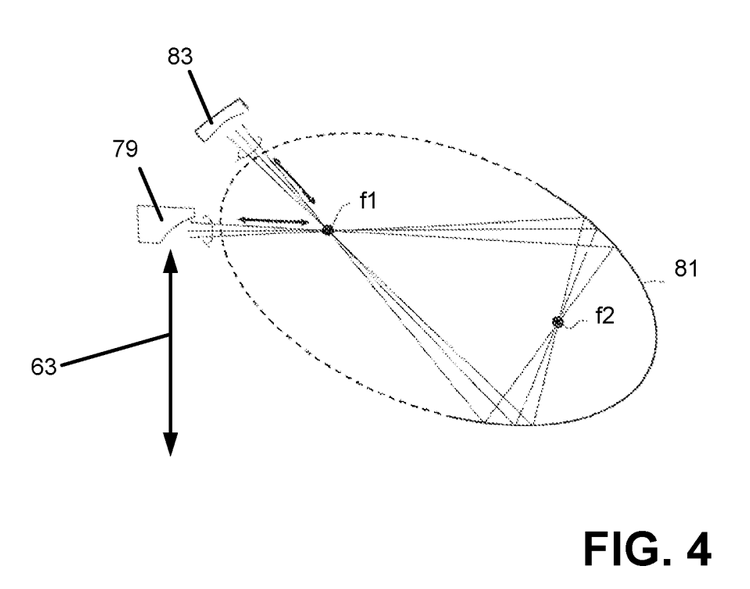
FIG. 4 shows an alternative embodiment of the focusing objective of the first Raman probe, according to the present disclosure.

The first probe 15 may be a probe specifically configured for Raman spectroscopic measurements of gaseous samples. Raman probes of this type are, for example, described in U.S. Pat. No. 7,692,786 B2 and U.S. Pat. No. 8,824,042 B2, which are incorporated herein by reference, and are sold by Kaiser Optical Systems Inc. under the product name Airhead™. In such an embodiment, the focusing objective 65 of the first probe 15 may include first surface mirrors 73, 77, as shown in FIG. 3, or reflectors 79, 81, 83, as shown in FIG. 4, for focusing and the collimating the light. The use of the first surface mirrors 73, 77 or the reflectors 79, 81, 83 instead of lenses reduces background noise and unwanted artefacts. The first surface mirrors 73, 77 or the reflectors 79, 81, 83 may be arranged such that they capture the excitation light within the focusing objective 65. In such an embodiment, the first surface mirrors 73, 77 or the reflectors 79, 81, 83 prevent the excitation light from intersecting inner surfaces of the measurement chamber 5, thus eliminating unwanted background signals that result from such intersections.

In both respects, the focusing objective described in U.S. Pat. No. 7,692,786 B2 and shown in FIG. 2 can be used. In such an embodiment, the objective 65 includes a first mirror 73, which may be an off-axis parabola, receiving the excitation light transmitted along the co-propagating path 63 either directly or via a folding mirror 75. The objective 65 may further include a second mirror 77, which may have a spherical surface, re-imaging the excitation light back through the same focus within the gas sample, where the excitation light is re-collimated by the first mirror 73 and returned to the co-propagation path 63. Because gaseous samples are typically optically very clear, the second focus on the return path effectively doubles the excitation power. Further, a collection aperture for the Raman signal is also effectively doubled because the Raman signal emitted in the direction of the second mirror 77 will also be collected and imaged back to the corresponding collection fiber 27.

In alternative embodiments, the focusing objective 65 of the first probe 15 may be structured as described in U.S. Pat. No. 8,824,042 B2 and shown in FIG. 4. In such an embodiment, the focusing objective 65 includes the reflectors 79, 81, 83 configured to provide a first focus f1 situated within the measurement chamber 5 and a second focus f2 situated within the measurement chamber 5, causing the incoming excitation light focused onto one of the foci to be multiply reflected and refocused onto alternating foci such that the numerical aperture of the excitation light progressively increases before it is collected and returned along the co-propagating path 63 with the Raman signal. In such an embodiment, the multiple retroreflections yield a higher efficiency collection of Raman emissions from the multiple foci. In certain embodiments of the focusing objective 65, the first focus f1 may be a real focus, and the second focus f2 may be a real or virtual focus.

The first probe 15 may further be configured to reduce unwanted signal noise accumulating along the signal path within the first probe 15, for example, as described in U.S. Pat. No. 7,692,786 B2 and shown in FIG. 2. In this respect, the band pass filter 57 may include a filter coating F on a substrate S, the mirror 59 may include a reflective coating R on a substrate S, and the beam combiner 61 may include a combiner coating C on a substrate S. Each of the coatings F, R and C may include low-background materials. In an embodiment, the filter coating F, the reflective coating R and the combiner coating C may be oriented such that the excitation light never passes through the substrates S of the bandpass filter 57, the mirror 59 or the combiner 61 after being filtered by the filter coating F of bandpass filter 57 before the excitation light is transmitted into the sample. The transmitted excitation light may be re-collected substantially in its entirety by the focusing objective 65 as describe above and redirected by the combiner coating C and the reflective coating R back through the filter coating F, thereby avoiding background signals otherwise generated by the combiner substrate S and the mirror substrate S.

The second probe 17 may be a probe configured for Raman spectroscopic measurements of liquid samples. For example, as shown in FIG. 3, the focusing objective 67 of the second probe 17 may include at least one lens 85 focusing the excitation light onto the liquid sample located inside the drain 11 and collecting the Raman signal emanating therefrom. The probe tip 21 of the second probe 17 may be by an isolation window 87, separating the probe tip 21 interior with the focusing objective 67 from the interior of the drain 11. In such an embodiment, the excitation light is transmitted through the window 87 into the liquid sample, and the Raman signal is received through the isolation window 87. The isolation window 87 may be a sapphire window or another suitable material transparent to the excitation light and the Raman signal.

In embodiment where the second probe 17 is disposed in the insert 3, for example, in the collector 9, the second probe 17 may be smaller in size than the first probe 15. This reduced size may be achieved by using one or more dielectric components and an optical configuration as described in U.S. Pat. No. 6,907,149 B2, for example, which is incorporated herein by reference. In such embodiment, the beam combiner 61 and the notch filter 69 may be dielectric edge filters. In addition or alternatively, the mirror 59 and the beam combiner 61 may be supported at an angle α of 20 degrees or less.

While various embodiments of a spectroscopic measurement system for measuring a material composition of a mixed phase fluid and methods for using and constructing the same have been described in considerable detail herein, the embodiments are merely offered by way of nonlimiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process is not be limited to the particular sequence of steps described. Other sequences of steps may be possible and still remain within the scope of the present disclosure.

The invention claimed is:

1. A spectroscopic measurement system for measuring a material composition of a mixed phase fluid flowing through a process pipe, the fluid having a gas phase dispersed in a liquid phase or vice versa, the measurement system comprising:
   an insert configured to be inserted into the pipe, the insert including:
      a measurement chamber defined on at least one side by a phase separating membrane, the phase separating membrane adapted to enable the gas phase of the fluid flowing through the pipe to diffuse into and out of the measurement chamber and to facilitate coalescing of the liquid phase of the fluid outside the measurement chamber, wherein the gas phase within the measurement chamber defines a gas sample; and
      a collector disposed adjacent the measurement chamber such that the coalesced liquid from outside the measurement chamber drains into the collector, wherein the collector includes a drain in fluid communication with the pipe such that the coalesced liquid collected by the collector flows through the drain and returns to the fluid flow of the pipe, and wherein the coalesced liquid flowing through the drain defines a liquid sample;
   a first probe mounted onto the insert, the first probe including a first probe tip extending into the measurement chamber and configured to transmit excitation light into the measurement chamber and to receive a gas Raman signal emanating from the gas sample within the measurement chamber;
   a second probe mounted onto the insert, the second probe including a second probe tip extending into the drain and configured to transmit excitation light into the drain and to receive a liquid Raman signal emanating from the liquid sample flowing through the drain; and
   an excitation light generation and signal evaluation unit configured to generate the excitation light, provide the excitation light to the first probe and the second probe, receive the gas Raman signal from the first probe and the liquid Raman signal from the second probe, and determine the material composition of the fluid based on the gas Raman signal from the first probe and/or the liquid Raman signal.

2. The measurement system of claim 1, wherein the excitation light generation and signal evaluation unit is further configured to determine the material composition of the fluid by determining a presence of one or more components of at least one of the gas phase and the liquid phase and/or determining relative amounts or concentrations of two or more components of at least one of the gas phase and the liquid phase.

3. The measurement system of claim 1, wherein the excitation light generation and signal evaluation unit includes an input configured to receive a flow rate of the fluid flowing through the pipe transmitted to the excitation light generation and signal evaluation unit by a flow meter measuring the flow rate, and
   wherein the excitation light generation and signal evaluation unit is further configured to determine relative amounts or concentrations of a set of predefined components of the fluid and to determine an energy content of the fluid based on the determined relative amounts or concentrations of the set of predefined components and on the flow rate provided via the input.

4. The measurement system of claim 1, wherein the phase separating membrane includes a chemically inert membrane material.

5. The measurement system of claim 4, wherein the chemically inert membrane material is expanded polytetrafluorethylene or spun-bonded silica.

6. The measurement system of claim 1, wherein the excitation light generation and signal evaluation unit includes:
an excitation light generator adapted to generate the excitation light and transmit the excitation light to the first probe and the second probe, wherein the excitation light is monochromatic light having a wavelength between 300 nm and 1.5 μm;
an evaluation unit configured to analyzing Raman spectra and determine the material composition of the mixed phase fluid based on the Raman spectra; and
a spectrograph configured to receive the gas Raman signal and the liquid Raman signal transmitted from the first probe and the second probe, filter Raman scattered light from the gas and liquid Raman signals, and disperse the Raman scattered light into different wavelengths, wherein the spectrograph includes a detector adapted to detect an intensity of the Raman scattered light as a function of a wavelength and provide the thus-obtained Raman spectra to the evaluation unit,
wherein the first probe is connected to the excitation light generation and signal evaluation unit via a first optical cable including at least one excitation fiber adapted to transmit the excitation light from the excitation light generator to the first probe and at least one collection fiber adapted to transmit the Raman signal received by the first probe to the detector, and/or
wherein the second probe is connected to the excitation light generation and signal evaluation unit via a second optical cable including at least one excitation fiber adapted to transmit the excitation light from the excitation light generator to the second probe and at least one collection fiber adapted to transmit the Raman signal received by the second probe to the detector.

7. The measurement system of claim 6, wherein the excitation light is monochromatic light having a wavelength between 770 nm and 790 nm.

8. The measurement system of claim 1, wherein:
the insert includes an insert base embodied to close off an opening in the pipe, the insert base including a mounting for attaching the insert to the pipe; and
the first probe is attached to insert base such that the first probe tip extends through the insert base into the measurement chamber.

9. The measurement system of claim 1, wherein:
the phase separating membrane is mounted to a support including a substantially cylindrical frame defining the measurement chamber and having at least one opening between an interior of the measurement chamber and an interior of the pipe; and
the at least one opening in the support is covered or filled by at least a portion of the phase separating membrane.

10. The measurement system of claim 9, wherein the insert includes a plurality of openings and a plurality of phase separating membranes, each phase separating membrane mounted to the support such that each opening is covered or filled by at least one of the plurality of phase separating membranes.

11. The measurement system of claim 1, wherein:
the collector includes a channel connecting a collector entrance to the drain; and
the collector is disposed adjacent the measurement chamber such that the coalesced liquid flows into the drain via the collector entrance and channel.

12. The measurement system of claim 1, wherein:
the insert includes an insert base embodied to cover an opening in the pipe, the insert base defining a side of the measurement chamber and including a support attached to the insert base and adapted to support the phase separating membrane; and
the collector is connected to an end section of the support opposite the insert base such that the collector defines an opposing side of the measurement chamber opposite the insert base.

13. The measurement system of claim 1, wherein:
the insert includes an insert base that closes off an opening in the pipe through which the insert is inserted into the pipe;
the second probe is mounted to the insert such that the second probe tip extends through a wall of the collector and into an interior of the drain; and
the second probe is connected to the excitation light generation and signal evaluation unit, which is disposed outside the pipe, via an optical cable extending through the insert base.

14. The measurement system of claim 1, wherein:
the first probe further includes a focusing objective including first surface mirrors or reflectors embodied and arranged to focus the excitation light onto the gas sample in the measurement chamber and to collect the Raman signal emanating from the gas sample;
the first surface mirrors or the reflectors are arranged as to capture the excitation light within the focusing objective; and/or
the reflectors generate a first focus situated within the measurement chamber and a second focus situated within the measurement chamber, causing the incoming excitation light focused onto one of the first focus or second focus to be multiply reflected and refocused onto the other of the first focus or second focus, alternating foci such that the numerical aperture of the excitation light progressively increases before the excitation light is collected together with the Raman signal emanating from the gas sample, wherein the first focus is a real focus and the second focus is a real or virtual focus.

15. The measurement system according to claim 1, wherein the first probe further includes:
an excitation lens adapted to collimate the excitation light transmitted to the first probe;
a mirror configured to reflect the filtered excitation light onto a beam combiner that is configured to direct the excitation light along a counter-propagating path to a focusing objective, wherein the focusing objective is adapted to focus the excitation light onto the gas sample within the measurement chamber and to collect the Raman signal emanating from the gas sample;
a notch filter adapted to filter the collected Raman signal returning along the counter-propagating path through the beam combiner; and
a collection lens adapted to focus the filtered collected Raman signal into a collection fiber configured to transmit the collected Raman signal to the excitation light generation and signal evaluation unit.

16. The measurement system of claim 15, wherein:
the first probe further includes a bandpass filter having a filter coating on a bandpass substrate and adapted to filter the collimated excitation light;
the mirror includes a reflective coating on a mirror substrate;
the beam combiner includes a combiner coating on a combiner substrate;
the filter coating, the reflective coating and the combiner coating are oriented such that the excitation light does not pass through the bandpass substrate, the mirror substrate or the combiner substrate after being filtered by the filter coating of the bandpass filter and before the excitation light is transmitted onto the gas sample; and
the transmitted excitation light is collected substantially in its entirety by the focusing objective and redirected by the combiner coating and the reflective coating back through the filter coating.

17. The measurement system of claim 1, wherein:
the second probe further includes:
an excitation lens adapted to collimate the excitation light transmitted to the second probe;
a mirror configured to reflect the filtered excitation light onto a beam combiner that is configured to direct the excitation light along a counter-propagating path to a focusing objective, wherein the focusing objective is adapted to focus the excitation light onto the liquid sample within the drain and to collect the Raman signal emanating from the liquid sample;
a notch filter adapted to filter the collected Raman signal returning along the counter-propagating path through the beam combiner; and
a collection lens adapted to focus the filtered collected into a collection fiber configured to transmit the collected Raman signal to the excitation light generation and signal evaluation unit.

18. The measurement system of claim 17, wherein:
the second probe further includes a bandpass filter adapted to filter the collimated excitation light;
the beam combiner and the notch filter are dielectric edge filters; and/or
the mirror and the beam combiner are supported at an angle of 20 degrees or less.

19. The measurement system of claim 1, wherein:
the second probe tip of the second probe is capped by an isolation window separating an interior of the second probe tip, which includes a focusing objective adapted to focus the excitation light onto the liquid sample within the drain and to collect the Raman signal emanating from the liquid sample; and
the isolation window is a sapphire window or another window transparent to the excitation light and the Raman signal.

20. The measurement system of claim 1, wherein the second probe is smaller in size than the first probe.

* * * * *